US006848116B1

(12) United States Patent
Land

(10) Patent No.: US 6,848,116 B1
(45) Date of Patent: Jan. 25, 2005

(54) METHOD AND APPARATUS FOR ON-DEMAND VIDEO PROGRAM ACCESS CONTROL USING INTEGRATED OUT-OF-BAND SIGNALING FOR CHANNEL SELECTION

(75) Inventor: Thomas Land, Ashburn, VA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 09/481,554

(22) Filed: Jan. 11, 2000

Related U.S. Application Data

(60) Provisional application No. 60/115,765, filed on Jan. 13, 1999.

(51) Int. Cl.[7] ............................................... H04N 7/173
(52) U.S. Cl. ......................... 725/78; 725/82; 725/106; 725/121; 725/126; 725/128
(58) Field of Search ............................... 725/4, 78, 82, 725/49, 68, 106, 108, 111, 109, 105, 121, 120, 128, 126

(56) References Cited

U.S. PATENT DOCUMENTS

| | | | | |
|---|---|---|---|---|
| 5,130,664 A | * | 7/1992 | Pavlic et al. .................. 330/55 |
| 5,483,277 A | * | 1/1996 | Granger ....................... 725/120 |
| 5,488,413 A | * | 1/1996 | Elder et al. .................. 725/106 |
| 5,610,916 A | * | 3/1997 | Kostreski et al. ............ 370/487 |
| 5,613,190 A | * | 3/1997 | Hylton ......................... 455/3.1 |
| 5,708,961 A | * | 1/1998 | Hylton et al. ................. 725/81 |
| 5,774,527 A | * | 6/1998 | Handelman et al. ...... 379/93.07 |
| 5,805,591 A | * | 9/1998 | Naboulsi et al. .......... 370/395.6 |
| 5,812,928 A | * | 9/1998 | Watson, Jr. et al. .......... 455/5.1 |
| 5,815,794 A | * | 9/1998 | Williams ..................... 725/125 |
| 5,832,041 A | * | 11/1998 | Hulyalkar .................... 375/340 |
| 6,212,278 B1 | * | 4/2001 | Bacon et al. ................ 380/240 |
| 6,219,409 B1 | * | 4/2001 | Smith et al. ........... 379/106.09 |
| 6,266,816 B1 | * | 7/2001 | Watson, Jr. et al. ........ 725/120 |
| 6,282,189 B1 | * | 8/2001 | Eames ......................... 370/352 |
| 6,286,142 B1 | * | 9/2001 | Ehreth .......................... 725/78 |
| 6,307,862 B1 | * | 10/2001 | Silverman ................... 370/442 |
| 6,317,884 B1 | * | 11/2001 | Eames et al. ............... 709/217 |
| 6,321,381 B1 | * | 11/2001 | Yuen et al. .................... 725/28 |
| 6,321,384 B1 | * | 11/2001 | Eldering ..................... 725/125 |
| 6,418,558 B1 | * | 7/2002 | Roberts et al. ............. 725/129 |
| 6,477,179 B1 | * | 11/2002 | Fujii et al. .................. 370/466 |
| 6,507,649 B1 | * | 1/2003 | Tovander .................... 379/230 |
| 6,574,794 B1 | * | 6/2003 | Sarraf .......................... 725/63 |

* cited by examiner

Primary Examiner—John Miller
Assistant Examiner—Annan Q. Shang
(74) Attorney, Agent, or Firm—Jim Zegeer

(57) ABSTRACT

An on-demand program access system for broadband, frequency division multiplexed cable television signals, one or more infrastructure element (IF) constituting a local video network signal server has a plurality of subscriber premise equipment elements (SPEE) served thereby. Each SPEE constitutes a video network client. Coaxial premise wiring connects each SPEE with the IE for conducting RF modulated programming signals and bi-directional data signals between the IE and each respective SPEE using out-of-band signaling so that there is no overlap between the programming signals and the bi-directional data signals.

5 Claims, 15 Drawing Sheets

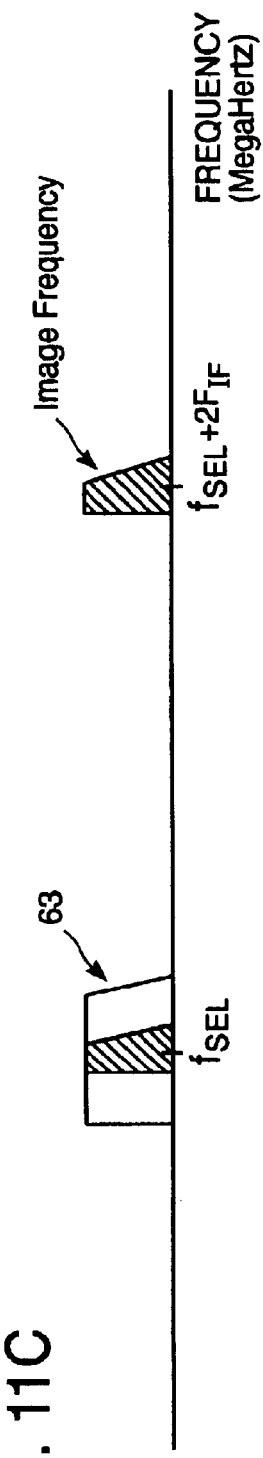
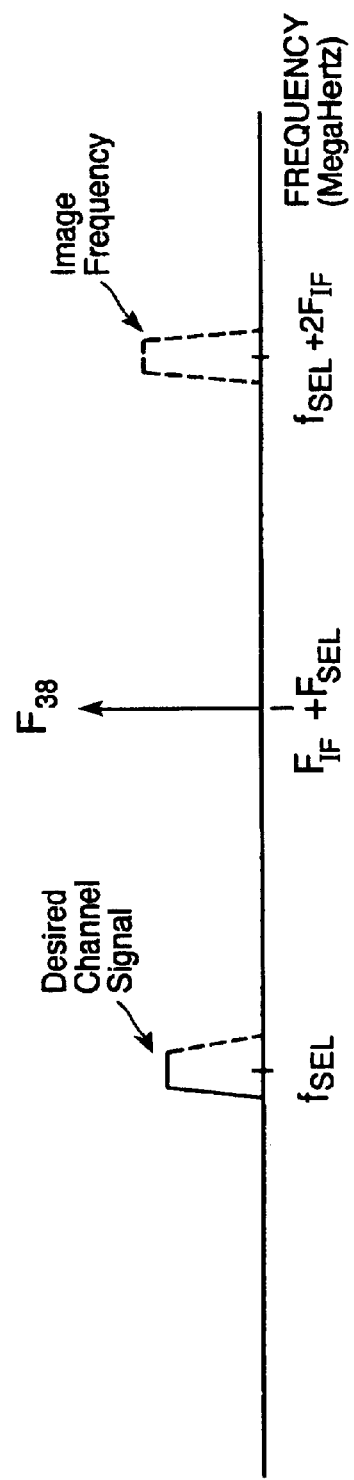
FIG. 11C
FIG. 11D

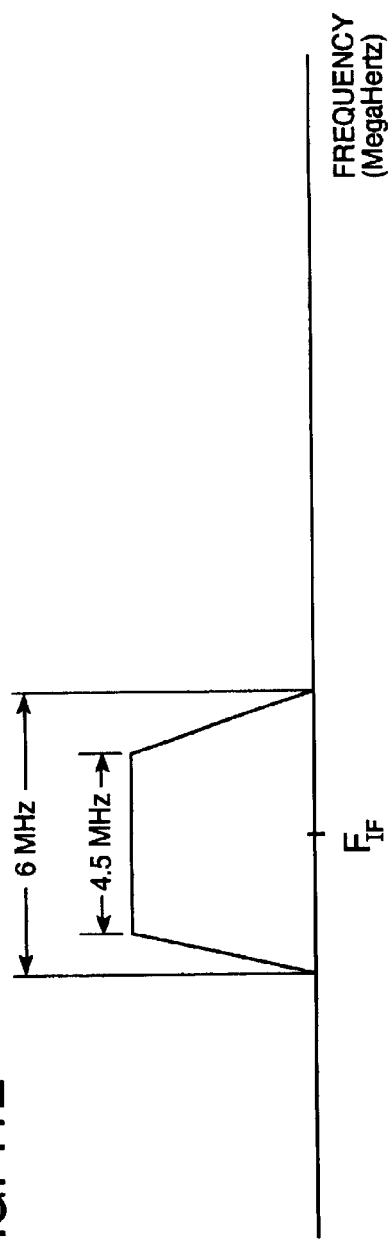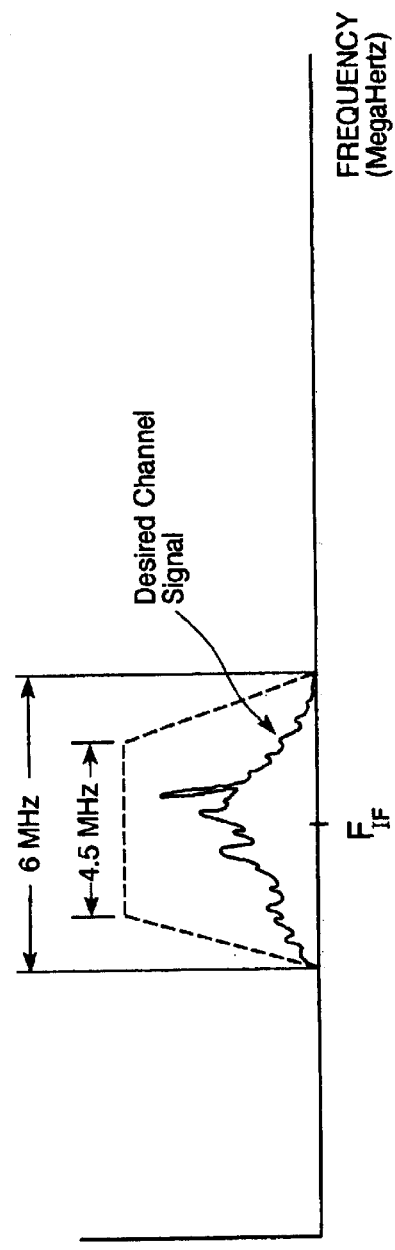

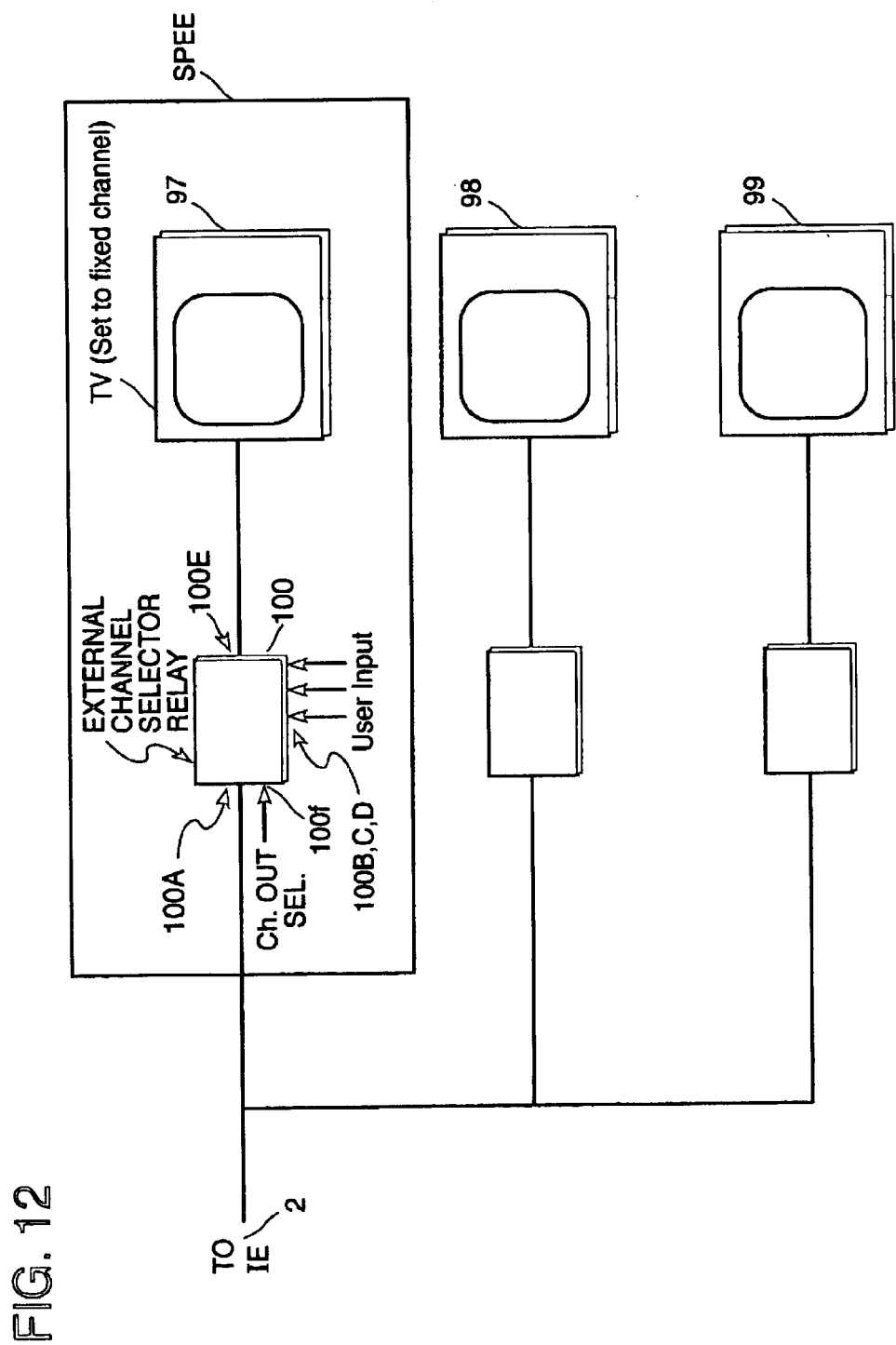

METHOD AND APPARATUS FOR ON-DEMAND VIDEO PROGRAM ACCESS CONTROL USING INTEGRATED OUT-OF-BAND SIGNALING FOR CHANNEL SELECTION

REFERENCE TO RELATED APPLICATION

The present invention is based on provisional application Ser. No. 60/115,765 filed Jan. 13, 1999 entitled METHOD AND APPARATUS FOR ON DEMAND VIDEO PROGRAM ACCESS CONTROL USING INTEGRATED OUT-OF-BAND SIGNALING FOR CHANNEL SELECTION.

BACKGROUND AND BRIEF DESCRIPTION OF THE INVENTION

The cable television industry broadcasts audio and video programming, and other services, into homes, businesses, and to other subscribers using a broadband, frequency division multiplexed signal over multiple media types, including RF, fiber optic, and coaxial cable media (FIG. 1). Typically, the last leg of the transmission is over coaxial cable into the subscriber premises and all programming services are available over this cable. Signals representing a multitude of programmed broadcasts are typically frequency division multiplexed within the 54 megahertz (MHz) to 860 megahertz frequency range. Moreover, in recent years, additional services have been proposed that further crowd the available spectrum below 1 gigahertz (GHz) that is typically achievable in much of the installed coaxial media. This includes proposals to use signaling in the 8 MHz to 46 MHz range, and 70 to 130 MHz range for two-way data signaling (FIG. 2). Because frequency assignments in the various cable television frequency standards may not coincide with the tuning capability of a subscriber's television set, typical subscriber premise equipment includes a separate box (the "cable converter") which is used to map incoming channels to another channel (typically channel 3 or 4) for which the subscriber's television set is capable of receiving (FIG. 3A). Use of a cable converter may be precluded if the subscriber has cable-ready equipment on the premises that is compatible with the cable signal being provided by the cable operator (FIG. 3B). However, in some cases, another class of cable converter may be required even in these cases to address frequency incompatibilities and/or signal decryption requirements.

In the case of subscription services (e.g. subscription movie channels) or Pay-per-View (PPV) programming, this necessitates the use of encryption technology that encrypt signals to restrict program access to authorized subscribers since access to the uncoded PPV and subscription signals would be possible otherwise within the customer premises, and would, therefore, represent a significant system security weakness. In turn, the use of encryption technology on these signals requires the placement of a decoder/descrambler/tuner box (or boxes) within the subscriber premises (FIG. 3C). These decoder boxes, and the conventional cable converter box, represent an equipment liability for the cable operator for which there are substantial annular losses due to theft, damage, and other forms of loss. And, because this equipment is typically installed on the customer premises, access for installation, service, and removal is limited to mutually convenient scheduled hours, which typically leads to increased service costs as a result of missed appointments. Further, because the equipment is typically installed on the customer premises, exposure to damages sustained due to equipment tampering adds to the liability that a cable operator must absorb in the cost of doing business.

The objects of this invention include reducing costs to the cable operator by reducing exposure to equipment losses by reducing (and, ultimately, eliminating) subscriber premises equipment (SPE) costs, and eliminating the requirement and cost associated with signal scrambling into the subscriber premises. The invention accomplishes this by providing on-demand cable programming using out-of-band signaling techniques to provide channel selection data from equipment located within the subscriber premises to signal-server equipment located outside the subscriber premises. Since, in the invention, a substantial majority of the SPE, formerly located within the subscriber premises, is moved outside the subscriber premises, there is increased equipment security, increased signal security, and the adjunct benefit of increased accessibility of equipment for servicing (thereby reducing loses due to rescheduled field service calls).

DESCRIPTION OF THE DRAWINGS

The above and other objects, advantages and features of the invention will become more clear when considered with the following specification and accompanying drawings, wherein:

FIG. 12 is a block diagram showing an alternative embodiment for the SPEE (e.g. multiple SPEE shown)

DETAILED DESCRIPTION OF THE INVENTION

Figure 4:
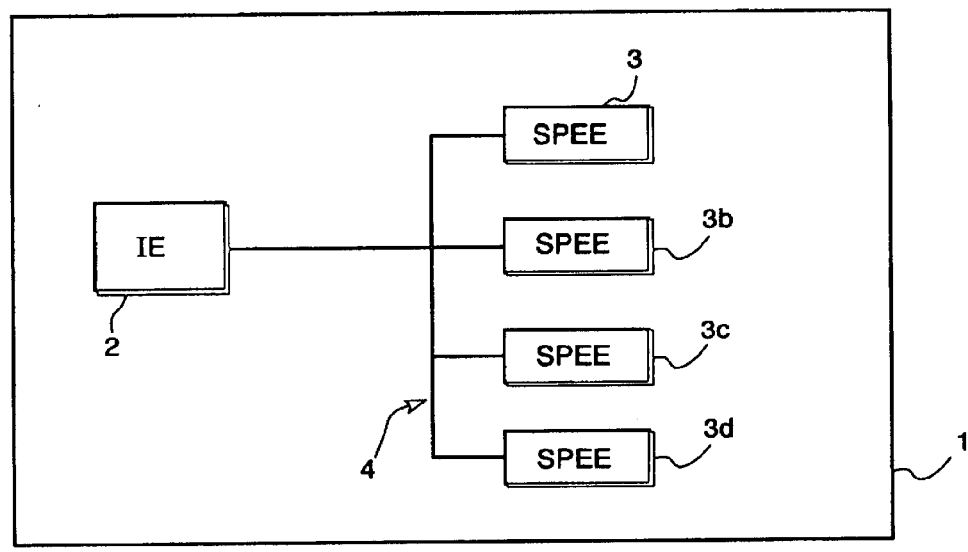
FIG. 4 is a block diagram of a service location.

The invention provides program access control for on-demand cable television programming, increased signal security, increased serviceability, and increased subscriber premise equipment security using the apparatus of FIG. 4. Although the preferred embodiment of the invention provides on-demand program access to broadband, frequency division multiplexed cable television signals, it can be readily understood by one skilled in the art that this same apparatus may be applicable to other signal selection and distribution problems of similar nature.

Figure 1:
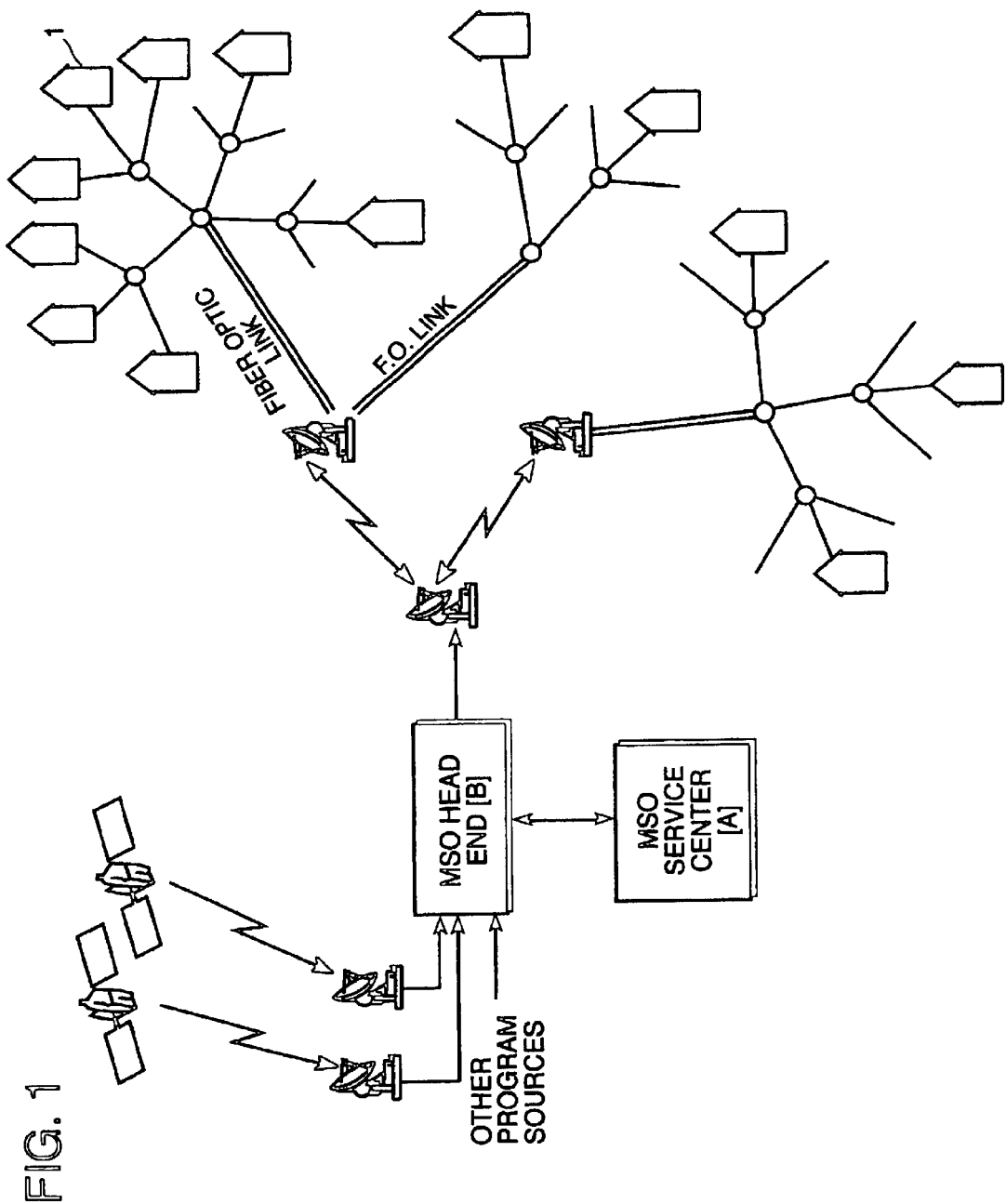
FIG. 1 is an overview of a cable TV distribution system.
Figure 2:
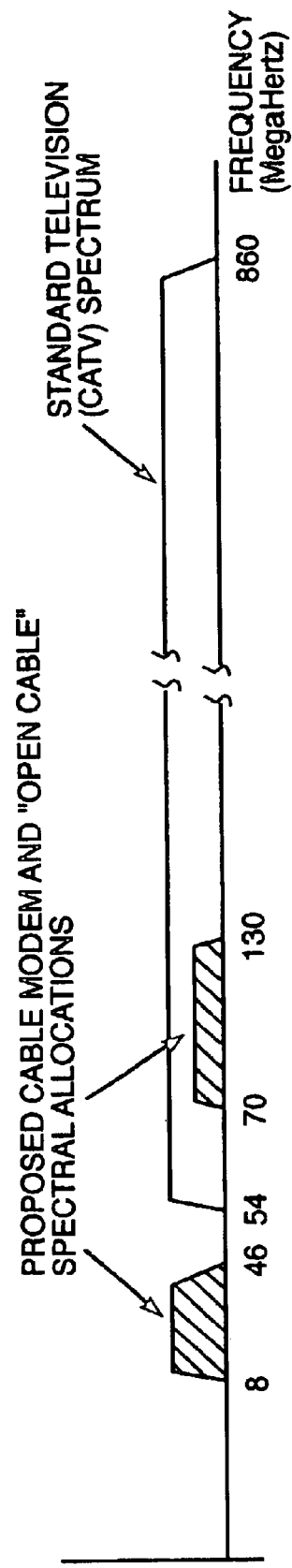
FIG. 2 illustrates the spectral allocation of available bandwidth involving a CATV distribution system.
Figure 3A:
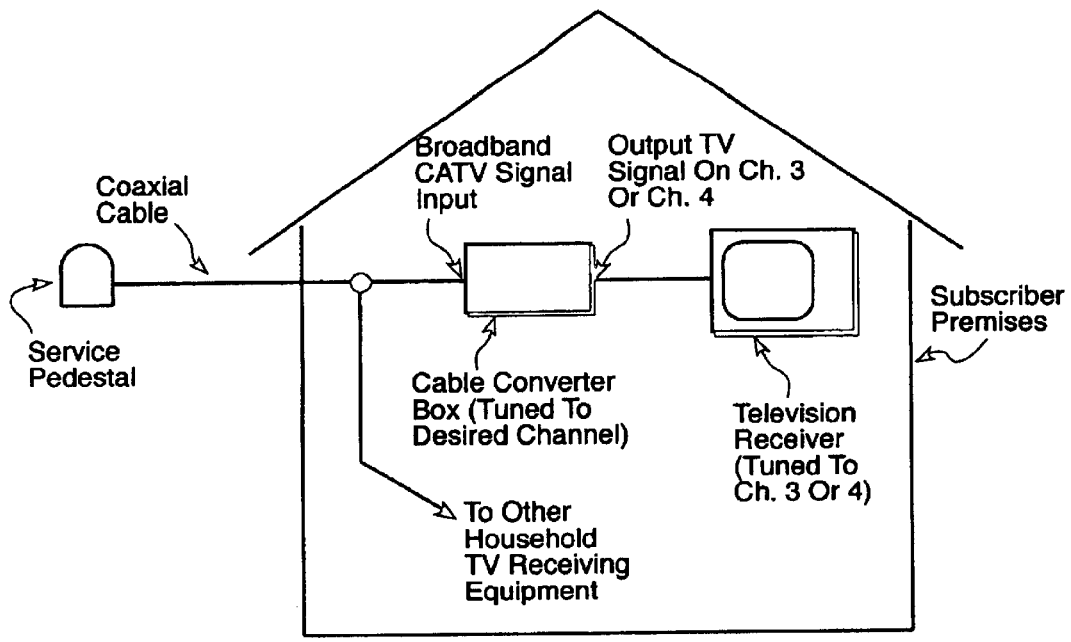
FIG. 3A is an illustration of subscriber premises using cable converter for CATV access.
Figure 3B:
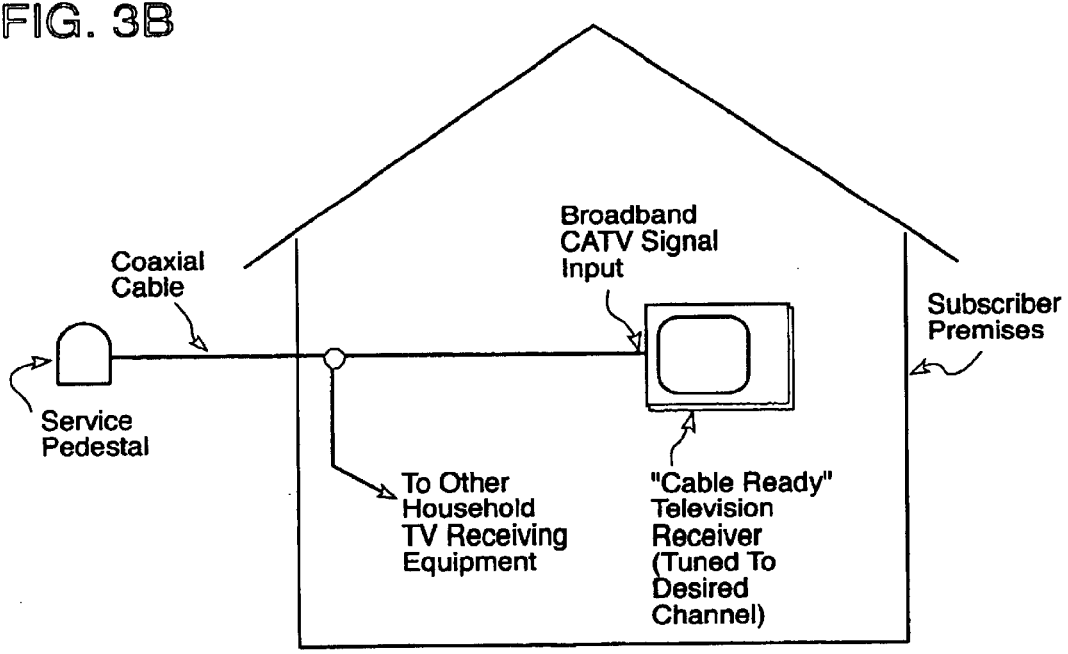
FIG. 3B is an illustration of subscriber premise equipped with "cable ready" television equipment for CATV access.
Figure 3C:
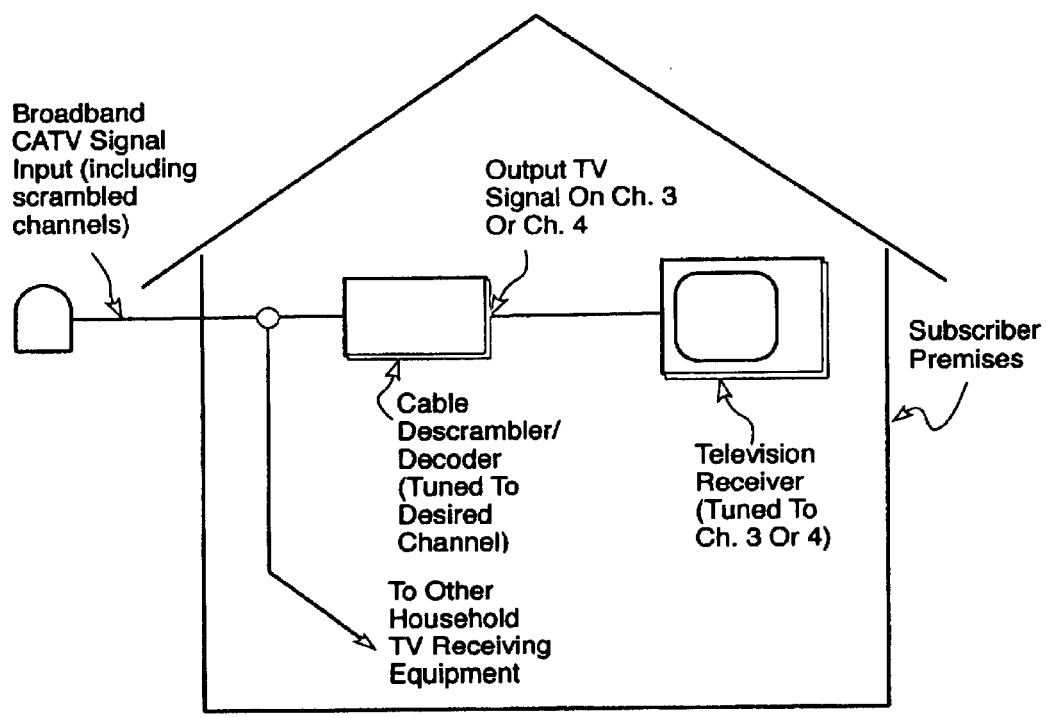
FIG. 3C is an illustration of subscriber premises equipped with a cable descrambler/decoder for access to subscription and pay-per-view (PPV) channels.
Figure 5:
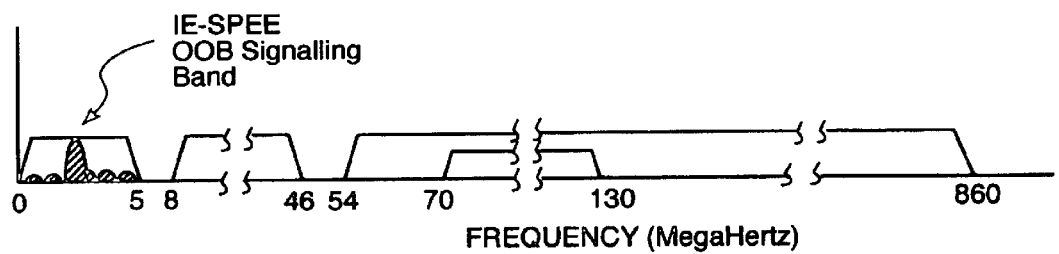
FIG. 5 illustrates spectral use of the invention depicting OOB signaling.

Cable television operators, and other media service operators (MSO), provide television and other program access to multiple households, or service locations, typically serving a broad geographic region, using a variety of channel media including RF, fiber optic, and coaxial cable media (FIG. 1). The subject invention is divided into two major functional subsystems contained within a service location 1 and a method of communications between them. Two major functional subsystems are the Infrastructure Element (IE) 2, which functions as a local video-network signal-server, and the Subscriber Premises Equipment Element (SPEE) 3, which functions as a video-network client. In the preferred embodiment of the invention, the SPEE 3 and the IE 2 are connected through coaxial premise wiring 4. Such coaxial premise wiring 4 is common in households today. The premise wiring 4 conducts radio frequency modulated television signals, or other programming signals, between the IE 2 to the SPEE 3. The coaxial premise wiring 4 also conducts bi-directional data signals between the IE 2 and the SPEE 3 using out-of-band (OOB) signaling techniques (FIG. 5) so that there i no spectral overlap between the television signal and the data signal. In the preferred embodiment of the invention, the OOB signaling technique would be implemented using a local area networking (LAN) protocol.

In practice, the SPEE 3 would respond to user input, received via keypad or other remote signaling device RS, to request a particular channel of television or other programming from the IE 2 using OOB signaling to transmit a data message over the coaxial premise wiring 4. The IE 2, upon receipt of the program request, would confirm the request by frequency-translating the requested channel to a channel frequency that is agreeable to requesting SPEE 3 and which does not conflict with programming being received by other SPEE 3 within the same service location 1.

Figure 6:
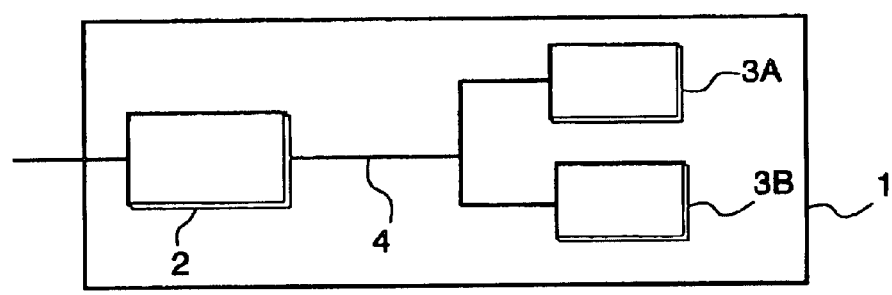
FIG. 6 is a block diagram of a service location showing fewer than four SPEEs connected to a single IE.
Figure 7:
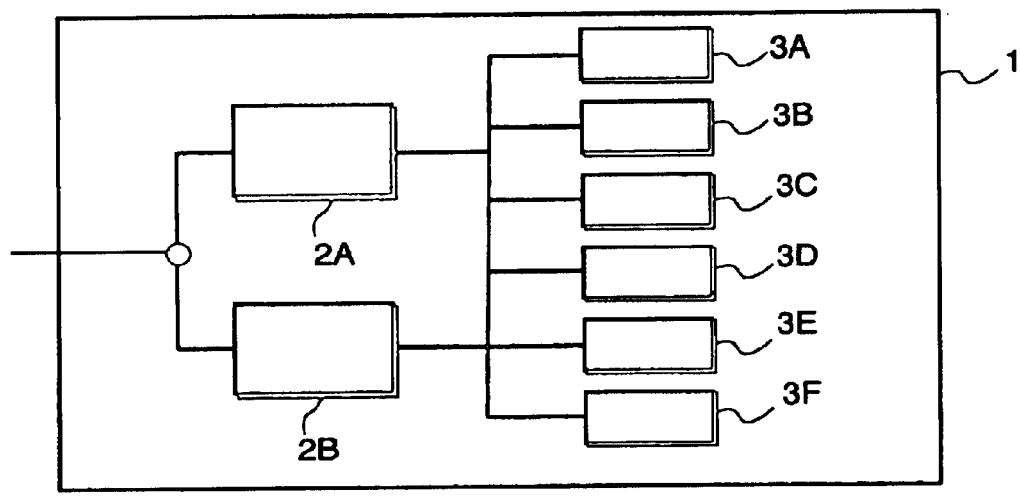
FIG. 7 is a block diagram showing how an expanded SPEE can be accommodated.

Multiple SPEE 3 may be connected to a single IE 2. In the preferred embodiment of the invention, up to four SPEE 3a–d may be connected to a single IE 2 to deliver up to four television channels, although it is clear that fewer SPEE may be connected to a single IE 2 (FIG. 6) without modification. Additionally, in instances where a greater number of SPEE 3 are required, the invention allows for the addition of additional IE 2a–b to accommodate the expanded SPEE 3a–f requirement (FIG. 7). Bi-directional communication between the IE 2 and singular or multiple instantiations of SPEE 3, and between multiple SPEE 3 and IE 2 in particular implementations, is achieved using OOB signaling through the coaxial premise wiring 4. In the preferred embodiment of the invention, the IE 2 is located outside the boundaries of the subscriber premises at a point which would provide unscheduled service access, and the SPEE 3 is located within the boundaries of the subscriber premises.

Figure 8:
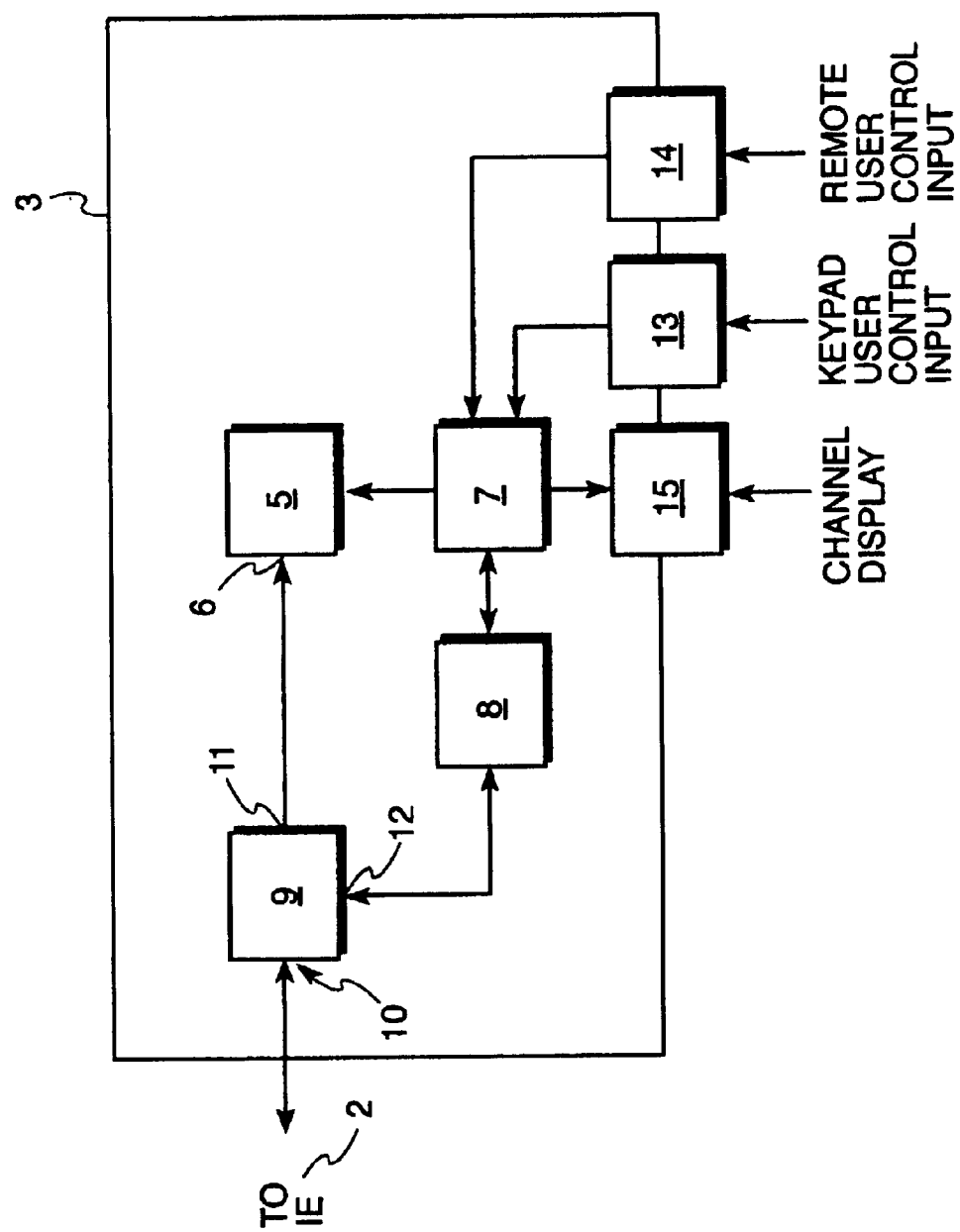
FIG. 8 is a block diagram of a subscriber premises equipment element.

In the invention, the SPEE 3, shown in FIG. 8, is composed of four major subelements: A television receiver 5 capable of receiving (and, in some cases, decoding, processing, recording and/or displaying) conventional television signals at their standard RF channel assignments via its signal input terminal 6, a microcontroller 7, a Local Area Networking (LAN) controller (acting as an OOB signaling converter) 8, and a frequency diplexer 9. The diplexer 9 separates and routes signal frequency components present at its input terminal 10 into the separate frequency bands corresponding to the television band on one terminal 11 and the IE-SPEE OOB signaling at the other terminal 12. The diplexer 9 also acts to combine frequency separated signals at terminals 11 and 12 into a single signal at terminal 10. The LAN controller 8 supports bi-directional communication between the SPEE 3 and the IE 2. In addition to the four major sub-elements, the SPEE 3 contains three additional minor sub-elements relating to the user interface: A local, keypad user control input 13; a remote user control input 14; and a display unit 15 which would be used to display the user channel selection.

In operation, the user of the invention would identify his or her channel selection by either direct entry using the keypad user control input 13 or using the remote user control input 14. The user channel selection is received by the microcontroller 7, which requests the identified channel from the IE 2 through the LAN controller 8 by sending a data message from the SPEE 3 to the IE 2 through the premise wiring 4. Upon receipt of confirmation of channel service from the IE 2 through the LAN controller 8, the television receiver 5 is directed by the microcontroller 7 to tune to the appropriate frequency at which the requested channel service is provided by the IE 2, and the channel display 15 is updated. In the preferred embodiment of the invention, all sub-elements would be contained in a single television set, although it is envisioned that other embodiments may be necessary to accommodate older television sets unequipped with the microcontroller 7, the LAN controller 8 and the diplexer 9 elements of the invention (see Alternative Implementation).

Figure 9:
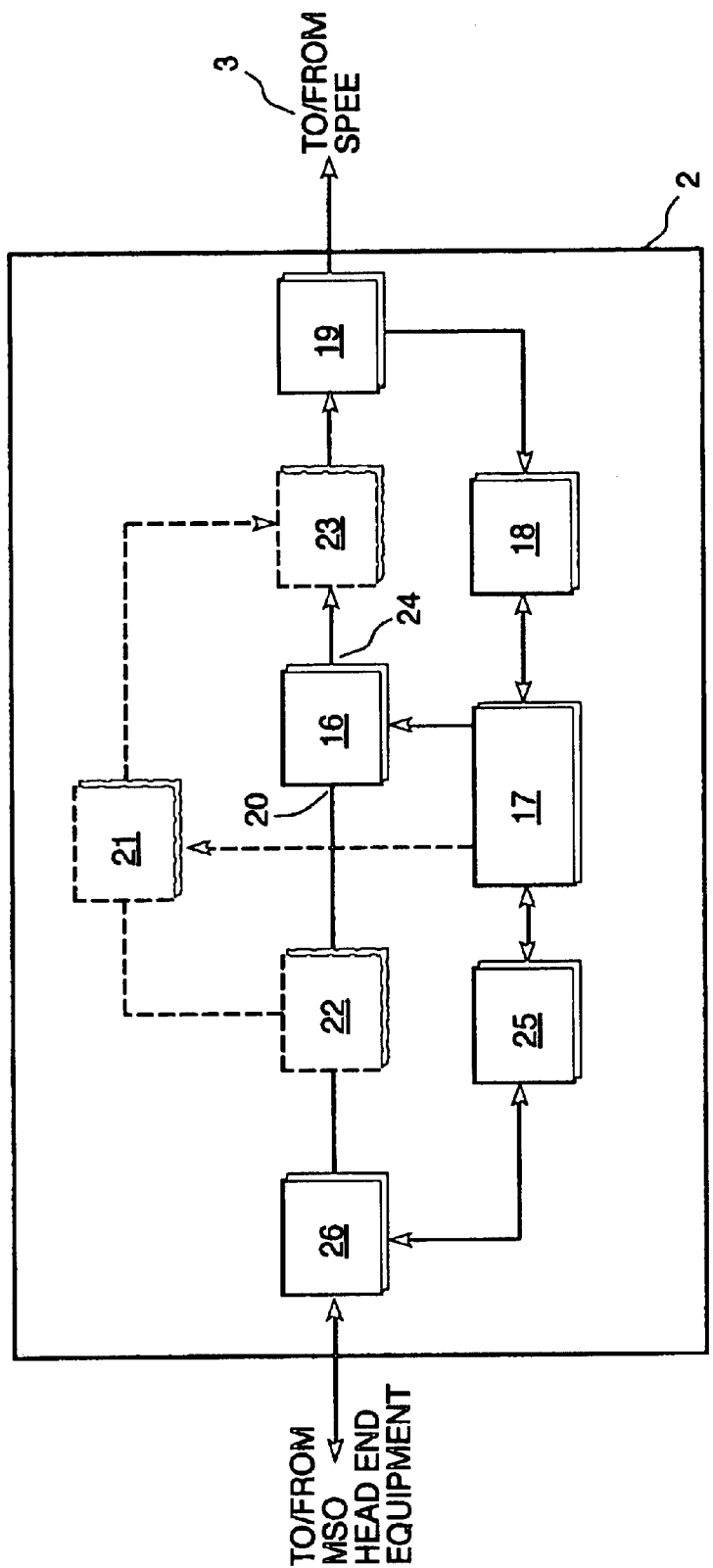
FIG. 9 is a block diagram of the infrastructure element.

The IE 2, illustrated in FIG. 9, is composed of six major sub-elements: A channel service tuner 16, a microcontroller 17, a LAN controller 18, an RF modem 25, an input diplexer 26, and an output diplexer 19. Both the output diplexer 19 and the input diplexer 26 act as described earlier for the SPEE diplexer 9. The channel service tuner 16 is depicted in greater detail in FIG. 10, and implements the frequency translation of up to four television channels received at its broadband signal 9 input 20, corresponding to the signal received by the MSO, to independently assigned and tunable channel frequencies at the output 24. In the preferred embodiment of the invention, the input and output frequencies of the 4 channels of the channel service tuner 16 are controlled by the microcontroller 17 which receives channel service requests from the SPEE 3 via the LAN controller 18. In particular implementations, it may be desirable to provide a bypass of one or more bands representing a subset of the frequency band available from the MSO-provided broadband signal for the purpose of passing one or more channels without having to pass through the channel service tuner. For this purpose, the basic IE architecture is readily adapted with the addition of an optional bypass filter 21 and two optional RF splitter/combiners, 22 and 23. In instances where it is desirable to have switched control over the bypass filter, switched control is feasible under command of the microcontroller 17. For the purposes of remote programming and control of subscriber service parameters (such as viewable channels, level of service, and for PPV programming) by the MSO, it is desirable to incorporate into the IE 2 a bi-directional communications capability to the MSO service center A (FIG. 1) through the head end equipment B (FIG. 1). This capability is embodied in the invention in the form of an RF modem 25 and an RF diplexer 26. Incorporation of these features into the IE 2 allows the MSO to control the television programming available to the subscriber, based upon his or her contracted service level, without making an on-site service call.

In operation, the IE 2 would receive data messages representing channel service requests from a particular SPEE 3 via premise wiring 4. Because the channel service requests are implemented using OOB signaling techniques, the request from the particular SPEE 3 will be separated and routed to the IE LAN controller 18 by the IE diplexer 19. The channel service requests is then received and processed by the microcontroller 17. If the requested channel is not already being provided either to another SPEE 3 within the same service location 1 or through the bypass filter 21, the microcontroller 17 commands the channel service tuner 16 to translate the requested channel, as assigned at the MSO side of the channel service tuner 20, to an unused output channel frequency at 24, and passes the frequency assignment back to the requesting SPEE 3 in the form of a message confirming channel service through the LAN controller 18. When a requested channel is already being provided by the IE 2 either to another SPEE or through the bypass filter (if installed), the microcontroller 17 may respond to the requesting SPEE 3 with a message confirming channel service, via the LAN controller 18, with information regarding the frequency assignment of the requested channel.

Figure 10:
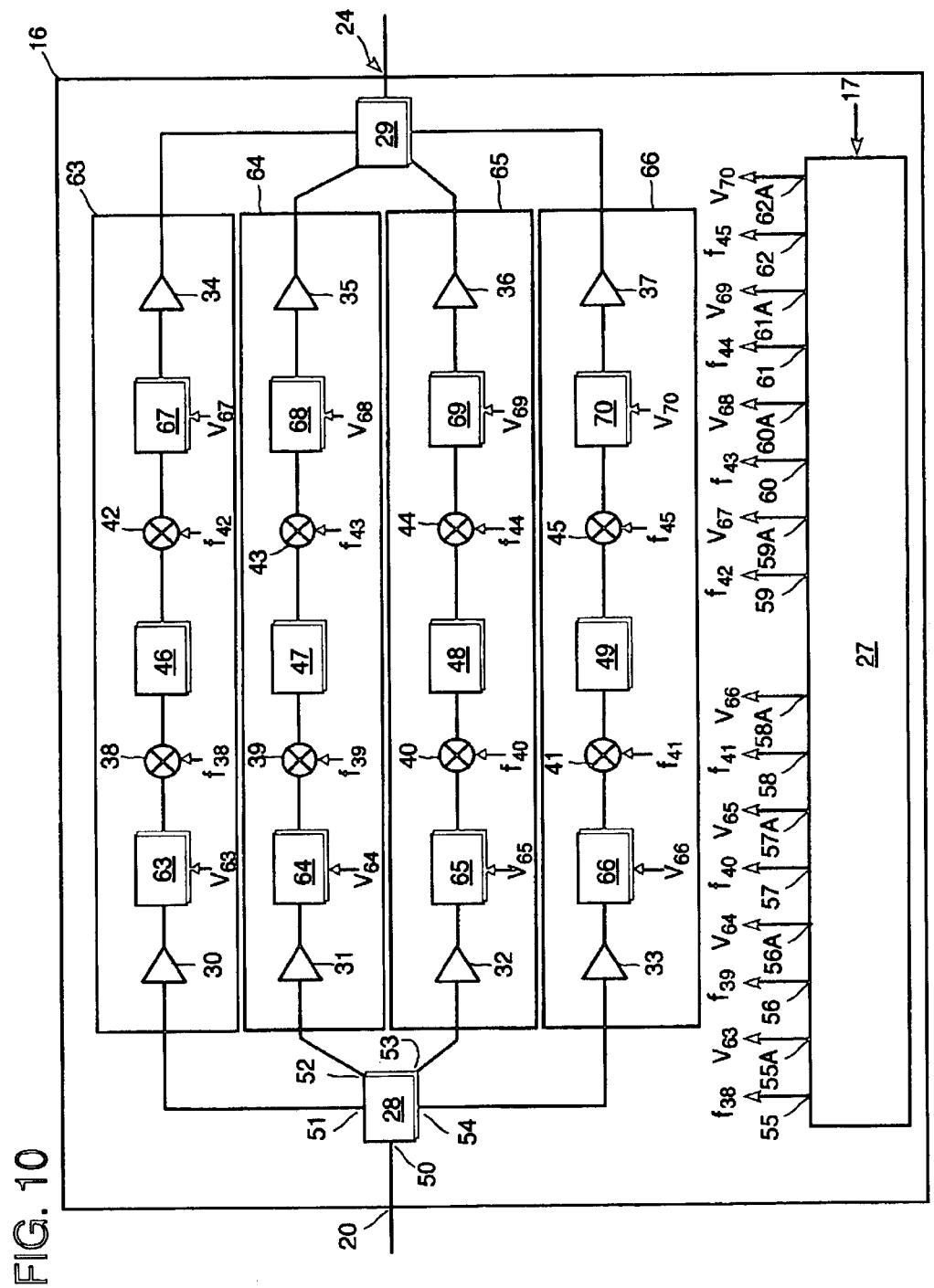
FIG. 10 is a block diagram of the channel service tuner.

An overview of the channel service tuner 16 is depicted in FIG. 10. The channel service tuner 16 is composed of a multi-output programmable frequency synthesizer 27, an RF splitter 28, an RF combiner 29, input RF amplifiers 30 through 33, output RF amplifiers 34 through 37, input mixers 28 through 41, input tunable filters 63 to 66, output mixers 42 through 45, output tunable filters 67 through 70, and bandpass filters 46 through 49.

In the preferred embodiment of the invention, the amplifiers, mixers, tunable- and bandpass-filters are organized into four RF circuit chains 63, 64, 65, 66 corresponding to the IE 2 capacity of four channels as previously described. In the invention, the broadband signal input provided by the MSO enters the channel service tuner 16 at the input 50 of the RF splitter 28, and is split into four identical broadband channels and output on 51 through 54. Each output of the RF splitter 28 provides the input to each of the four RF circuit chains 63, 64, 65, and 66 previously identified.

The frequency synthesizer 27 provides eight programmable frequency outputs 55 through 62. Four outputs, 55 through 58, are used to drive the input mixers, 38 through 41; and four outputs, 59 through 62, are used to drive the output mixers, 42 through 45. In addition, the frequency synthesizer 27 provides eight tuning voltage outputs 55a through 62a which are used to set the passband of their respective tunable filters 63 through 70. For purposes of the following discussion, the operation of the first RF circuit chain 63 is equally applicable to the cascade of elements in each of the remaining three RF circuit chains 64, 65 and 66.

Figure 11A:
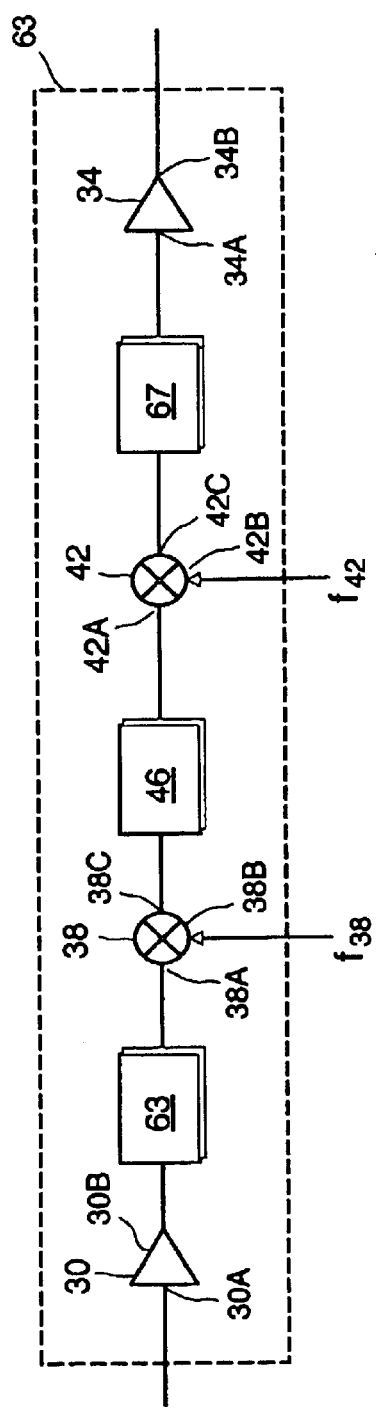
FIG. 11A illustrates the selection circuit.
Figure 11B:
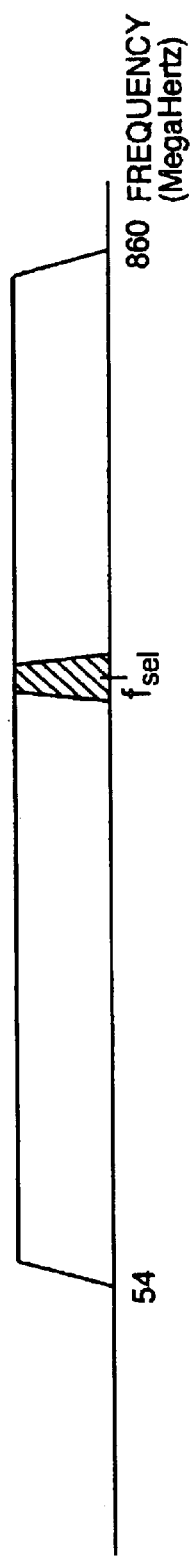
FIG. 11B illustrates a simplified frequency spectrum at point 30a in FIG. 11A.

The operation of the first RF circuit chain 63 is illustrated for example purposes only in the FIGS. 11A–H and described herein with the following three assumptions (again, for illustrative purposes only):

1. The user has selected channel service for the video signal centered at $F_{SEL}$ as depicted in FIG. 11A.
2. The IE microcontroller 17 has assigned the target output frequency $F_{TARGET}$, as the frequency at which the television receiver 5 will tune to receive the requested channel service, and
3. There is an intermediate frequency (IF), $F_{IF}$ whereby the selected channel will be isolated from adjacent channels in the frequency translation process.

In this embodiment, the broadband television signal, covering the 54 MHz to 860 MHz frequency range (FIG. 11B), is input to the input terminal 30a of the input amplifier 30. The output terminal 30b of the input amplifier 30 is connected to the tunable input filter 63 which removes the image frequency component, ($F_{IMAGE}$) located at $F_{SEL}+2F_{IF}$, which would otherwise interfere with the fidelity of the subsequent mixing action of the input mixer 38. The output of the tunable input filter 63 sends the filtered signal to the RF input 38a of the input mixer 38.

Figure 11G:
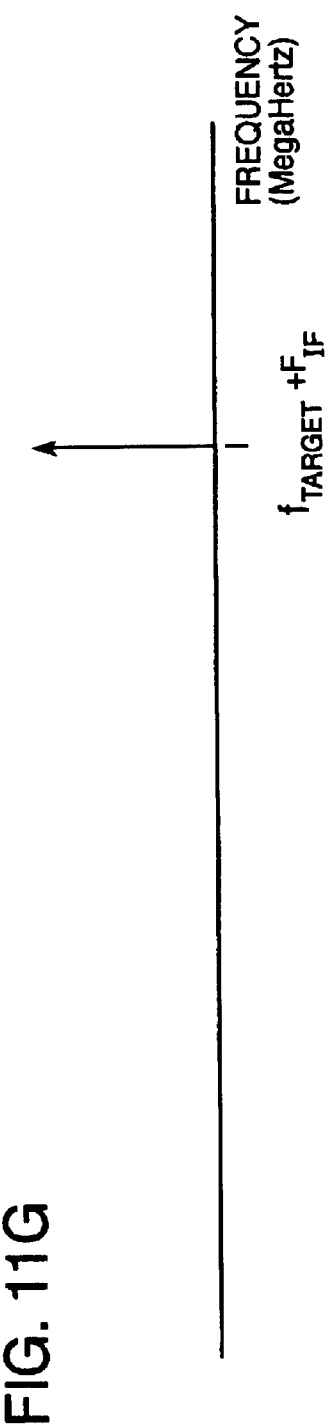
FIG. 11C illustrates the approximate passband characteristics of element 63.
FIG. 11D illustrates the operation of the frequency synthesizer.
FIG. 11E is the approximate attenuation characteristic of bandpass filter 46.
FIG. 11F illustrates the frequency spectrum at mixer input points 42a, FIG. 11G illustrates a simplified frequency spectrum at the output point 42b showing output of local oscillator frequency $F_{42}$.
FIG. 11H illustrates a simplified frequency spectrum of output signal at point 34b.
Figure 11H:
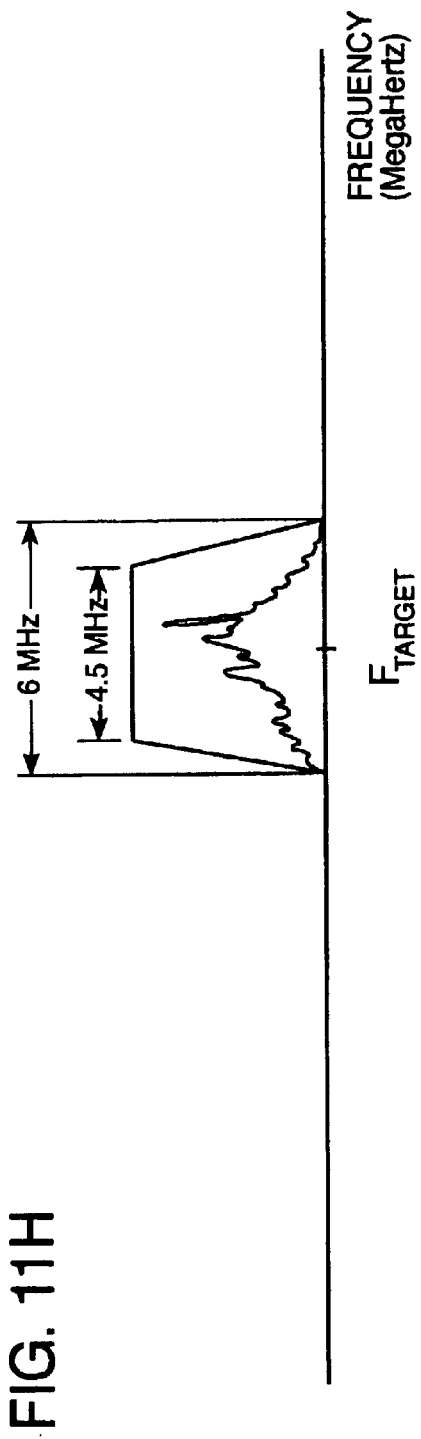
Figure 13:
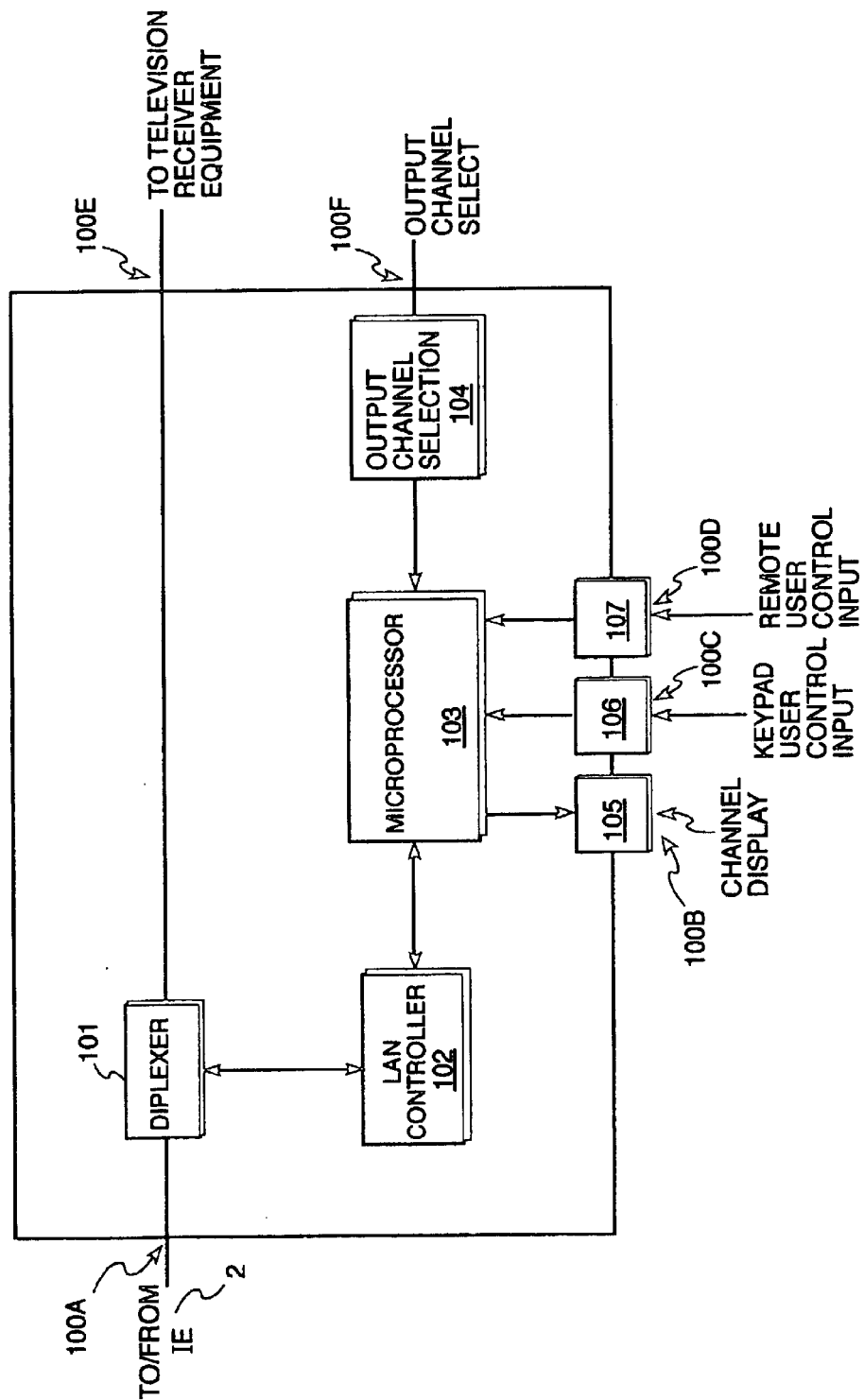
FIG. 13 is a block diagram showing the channel selector architecture for the external channel selector relay 100 shown in FIG. 12.

Under control of the microcontroller 17, the frequency synthesizer 27 output 55 (shown as $F_{38}$) is set to $F_{SEL}+F_{IF}$, where $F_{IF}$ represents the center frequency of the bandpass filter 46, and drives the local oscillator input 38b of the input mixer 38. With attenuation characteristics such as those shown in FIG. 11E, the bandpass filter 46 allows the video signal centered at $F_{SEL}$, the desired signal of the single desired television channel, now frequency translated to $F_{IF}$ as depicted in FIG. 11F, to pass. Given that the synthesizer output, $F_{42}$ has been set to $F_{IF}+F_{TARGET}$ by the microcontroller 17 as illustrated in FIG. 11G, $F_{42}$ will drive the local oscillator input 42b of the output mixer 42 such that the signal centered at $F_{IF}$ at the output mixer 42 IF input 42a will be frequency translated to $F_{TARGET}$ as shown in FIG. 11h. The tunable output bandpass filter 67 removes the undesired output product at $F_{TARGET}+2F_{IF}$ that results from the mixing action of 42. In summary, this example demonstrates the functionality of the four RF circuit chains 63, 64, 65 and 66 to be for the purpose of translating the desired television signal centered at $F_{SEL}$ to the target output frequency $F_{TARGET}$, where the television receiver 5 will look for the requested channel service.

Alternative Implementation

Though it is the preferred embodiment of the invention for the SPEE 3 to be a self-contained equipment element, it is recognized that an alternative embodiment of the invention is necessary to satisfy requirements arising from the installed base of television equipment unequipped with the microcontroller 7, the LAN controller 8 and the diplexer 9 elements of the invention. To meet the needs of such existing equipment, the alternative implementation of FIG. 12 is proposed.

While the invention has been described in relation to preferred embodiments of the invention, it will be appreciated that other embodiments, adaptations and modifications of the invention will be apparent to those skilled in the art.

What is claimed is:

1. An on-demand program access system for broadband, frequency division multiplexed cable television signals comprising:

an infrastructure element (IE) constituting a local video network signal server, said IE including input and output diplexers connected to said cable, a channel service tuner, means connecting said channel service tuner between said input and output diplexers, respectively, a RF modem connected to said input diplexer, a microcontroller connected to said RF modem, and a LAN controller connected to said microcontroller, said microcontroller controlling said channel service tuner, and a plurality of subscriber premise equipment elements (SPEE), each SPEE constituting a video network client, coaxial premise wiring connecting each SPEE with said IE for conducting RF modulated programming signals and bi-directional data signals between said IE and each respective SPEE using out-of-band signaling so that there is no overlap between said programming signals and said bi-directional data signals.

2. An on-demand program access system for broadband, frequency division multiplexed cable television programming signals comprising:

an infrastructure element constituting a local video network service, said infrastructure element comprised of a channel service tuner, a microcontroller, a LAN controller, an RF modem, and input diplexer and an output diplexer, said input diplexer and said output diplexer being connected to said channel service tuner, said input RF diplexer being connected for bi-directional control signals to said RF modem, said channel service tuner implementing frequency translation of up to four television channels, the input and output frequencies of the four channels of the channel service tuner being controlled by said microcontroller which receives channel service requests from a subscriber premise equipment element (SPEE), through said LAN controller, a plurality of subscriber premise equipment elements (SPEE), coaxial premise wiring means connecting each SPEE with said output diplexer for conducting RF modulated program signals and bi-directional data signals between the IE and each respective SPEE using out-of-band signaling so that there is no overlap between said programming signals and said bi-directional data signals.

3. The on-demand program access system for broadband frequency division multiplexed cable television programming signals as defined in claim 2 including first and second RF splitter combiners connected on the upstream and downstream ends of said channel service tuner, respectively, and a bypass filter connecting between said two RF splitter/combiners and controlled by said microcontroller.

4. The invention defined in claim 3 wherein said bypass filter is switch-controlled by said microcontroller.

5. An on-demand program access system for broadband, frequency division multiplexed cable television programming signals comprising:

an infrastructure element constituting a local video network service, said infrastructure element comprised of a channel service tuner, a microcontroller, a LAN controller, an RF modem, and input diplexer and an output diplexer, said input diplexer and said output diplexer being connected to said channel service tuner, said input RF diplexer being connected for bi-directional control signals to said RF modem, said channel service tuner implementing frequency translation of up to four television channels, the input and output frequencies of the four channels of the channel service tuner being controlled by said microcontroller which receives channel service requests from a subscriber premise equipment element (SPEE), through said LAN controller, first and second RF splitter combiners connected on the upstream and downstream ends of said channel service tuner, respectively, and a bypass filter connected between said two RF splitter/combiners and controlled by said microcontroller, a plurality of subscriber premise equipment elements (SPEE), coaxial premise wiring means connecting each SPEE with said output diplexer for conducting RF modulated program signals and bi-directional data signals between the IE and each respective SPEE using out-of-band signaling so that there is no overlap between said programming signals and said bi-directional data signals.

* * * * *